Figure 4:
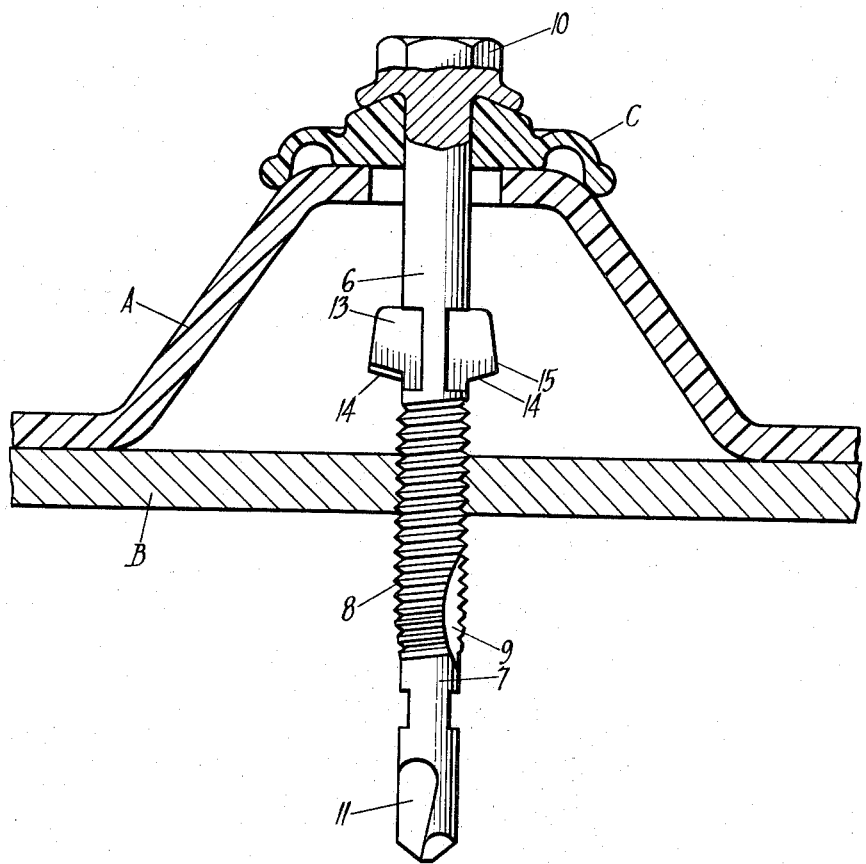

United States Patent [19]
Wilson et al.

[11] 3,869,219
[45] Mar. 4, 1975

[54] DRILL SCREW

[76] Inventors: Robert Neil Wilson, 7 Redvers St., Surrey Hills, Victoria, Australia; John James Hart, 6 Roseberry Ave., Brighton East, Victoria, Australia 3187

[22] Filed: Oct. 29, 1973

[21] Appl. No.: 410,833

[30] Foreign Application Priority Data
Oct. 30, 1972 Australia.............................. 1019/72

[52] U.S. Cl...................... 403/282, 85/47, 403/283, 403/408, 403/388
[51] Int. Cl.......................... F16b 5/02, F16b 25/00
[58] Field of Search ........... 403/388, 408, 282, 283; 52/758 F; 85/47, 41; 10/140

[56] References Cited
UNITED STATES PATENTS

| | | | |
|---|---|---|---|
| 2,672,107 | 3/1954 | Widman ............................ | 52/758 F |
| 3,196,733 | 7/1965 | Cohen et al. ..................... | 52/758 F |
| 3,358,548 | 12/1967 | Dyslin ................................ | 85/47 |
| 3,694,838 | 10/1972 | Runton ............................... | 10/140 |
| 3,699,841 | 10/1972 | Lanius, Jr. ........................ | 85/41 |

*Primary Examiner*—Werner H. Schroeder
*Attorney, Agent, or Firm*—Robert W. Beart; Thomas W. Buckman

[57] ABSTRACT

The invention provides a screw for use particularly in fastening ribbed sheeting - such as roof sheeting, and especially roof sheeting made of plastic material - to a support such as a purlin wherein the screw has means for forming an enlarged hole in the sheeting so as to permit relative movement between the sheeting and the support due to thermal expansion and contraction. The screw has a shank, a head at one end of the shank, screw threads on an intermediate part of the shank, and between the head and part at least of the screw threads at least one outwardly extending wing member operable to enlarge a hole previously formed in the sheeting to allow the screw-threaded part of the shank to be fitted therethrough. This screw is preferably a drill-point, thread-cutting screw and the wing means are adapted to form in the sheet an enlarged hole large enough to permit relative movement as between the sheet and the support due to thermal expansion and contraction of the members.

5 Claims, 4 Drawing Figures

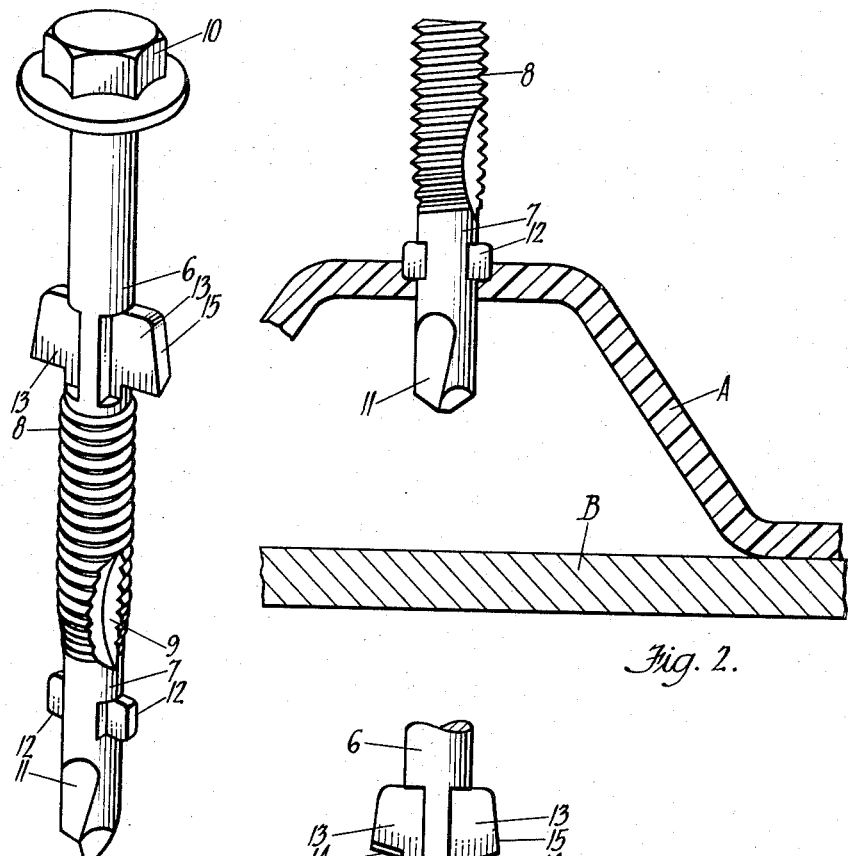
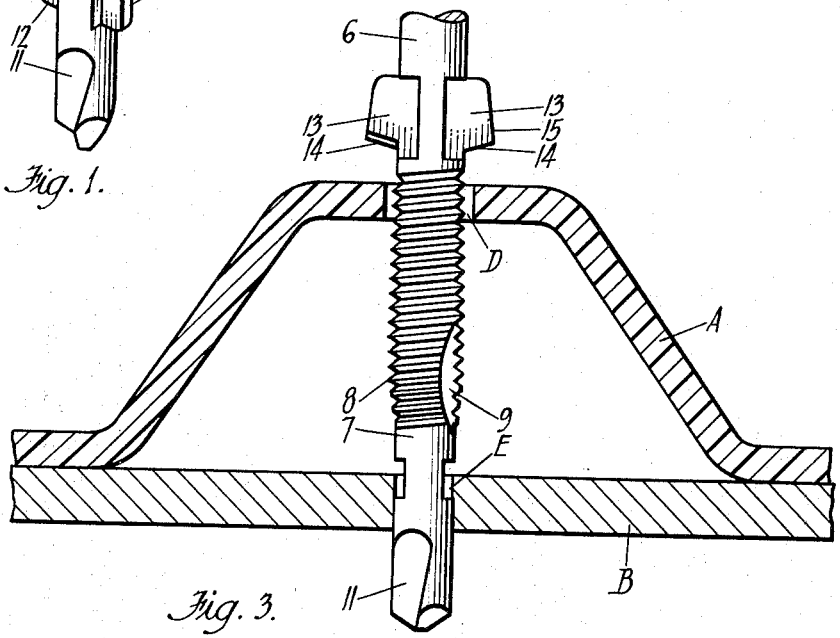
Fig. 1.
Fig. 2.
Fig. 3.

DRILL SCREW

This invention relates to a screw and it refers particularly to a drill screw for use in fastening two or more panels in superimposed relationship.

In fastening two panels together, or to fasten a panel or sheet to a support, it is common to provide a pilot hole in the first or outer panel or sheet (hereinafter referred to as 'sheet') and to pass a screw through that hole so as to engage in the second panel or support, the pilot hole being of a size greater than the crest diameter of the screw threads. If such a pilot hole is not provided the threads of the screw will engage the first sheet and will tend to move the first sheet relative to the second panel or support (hereinafter referred to as 'support') if, as is usual, the rate of penetration of the screw into the support is less than the rate of linear movement between the threads of the screw and the first sheet.

In order to overcome that difficulty it has been proposed to provide a drill screw having between the drill point and the start of the screw thread a pair of diametrally opposed wings operable to enlarge a hole formed in the first sheet by the drill point to a size large enough to provide clearance for the screw threads. Such a screw is described and illustrated in United Kingdom Pat. No. 1,093,709.

However, in certain circumstances it is desirable that the hole in the first sheet, for the reception of the fastening screw, should be of relatively large diameter so as to allow for relative movement between the first sheet and the support such as may be caused by thermal expansion or contraction. This is particularly the case when plastic roofing sheets, such as those made of an acrylic plastic, are fastened to a metal frame. It is also desirable that the hole in the first sheet should not be overlarge when the drill screw is being engaged with the support, in order that the drill-screw will be steadied as a hole is being drilled in that support, and in order that the drill screw may be held substantially co-axial with the hole in the first sheet, so as to ensure that the two holes are substantially in alignment.

It is also desirable in many cases that in the formation of the relatively large diameter hole in the first sheet the pressure exerted on the first sheet by the hole-enlarging means should be a controllable pressure, such as a manual pressure, not subject to influences such as the engagement of the screw thread of the drill screw in the support.

The invention devised with these and other requirements in view provides a screw having a screw-threaded shank portion and, between such screw-threaded shank portion and the outer end or head of the screw, at least one integral outwardly extending wing member capable of enlarging a hole formed in a panel for the passage of the screw-threaded shank portion.

Preferably there are two said wing members in diametrally opposed relationship, and said wing members may be formed so that their front edges are shaped to provide two cutting edges.

In the preferred construction the invention is incorporated in a drill screw of the type described in U.K. Pat. Specification No. 1,093,709, said screw having a drill point and, between that drill point and the screw threaded shank portion, primary wings of the same type but somewhat smaller in radial dimension than the at least one integral outwardly extending wing member previously mentioned.

The proportions of the screw may be such that, in use, the screw will first drill a hole in the first sheet, then enlarge that hole to provide a clearance for the screw-threaded shank portion of the screw, next drill a hole in the support member, then enlarge the clearance hole in the first panel to permit of expansion and contraction of the first sheet without buckling, and then form a screw thread in the support member.

In order that the invention may be clearly understood and readily put into practical form reference will now be made to the accompanying illustrative drawings wherein:

FIG. 1 is a perspective view, on enlarged scale, of a trepanning drill screw made according to the invention;

FIGS. 2, 3 and 4 illustrate progressive stages in the progress of a screw, as illustrated in FIG. 1 but having a resilient washer fitted to it, as it is driven through a sheet of roofing and into a support member in order to fasten the roofing sheet to the support, FIG. 2 illustrating the initial penetration of the drill point and the primary wings of the screw through the sheeting, FIG. 3 illustrating the clearance hole in the sheeting and the front end of the screw after the primary wings have broken away, and FIG. 4 illustrating the enlarged hole in the sheeting and the engagement of the screw with the support member when the sheeting is firmly fastened in position.

The screw illustrated in these drawings is basically a drill-point thread-cutting screw of known type, such as is sold under the registered trade mark TEKS, and it has plain or unthreaded shank portions 6 and 7 between which is a screw-threaded shank portion 8 fluted at 9 to provide thread-cutting means, a flanged head 10 at the rear end of the shank portion 6 and a fluted drill point 11 at the front end of the shank portion 7, said parts 10, 6, 8, 7 and 11 being of unitary construction and co-axial. The front end part of the screw-threaded part 8 is tapered to assist in the engagement of the screw-thread with the support member.

Between the drill point 11 and the screw-threaded part 8 there are two diametrally opposed radially extending primary wings 12, forged or pressed out of the metal of the shank portion 7 as described in the U.K. Pat. Specification No. 1,093,709. These primary wings 12 are operable to enlarge to a small extent a hole formed in relatively soft material, such as plastic sheeting, by the drill point 11 and thus provide clearance for the passage of the screw-threaded shank portion 8 through the sheeting without engaging therewith in screw-threaded manner, but are not sufficiently strong to withstand engagement with relatively hard material such as metal. Therefore said primary wings 12 are adapted to break away when the drill point 11 has penetrated such harder material and the front edges of said primary wings engage that harder material.

A second pair of diametrally opposed wings, indicated by the reference 13, is provided in the shank portion 6 a short distance rearwardly of the screw-threaded portion 8 and these secondary wings 13 are substantially greater radial dimension and substantially stronger than the primary wings 12. As shown in FIGS. 3 and 4 of the drawings the front edge 14 of each of the wings 13 is inclined rearwardly and outwardly and the outer side edges 15 of these wings are tapered rearwardly and inwardly a small extent. Further, the front edges of the secondary wings 13 are shaped to provide a rake so as to improve the cutting quality of the front edges of said wings 13.

The secondary wings 13 are operable to enlarge substantially the clearance hole resulting from the drilling action of the drill point 11 and the primary wings 12.

In a modified design of the secondary wings each of said wings has a forwardly projecting cutter tooth at its outer side, to act as a trepanning cutter. Each said cutter tooth is shaped to provide adequate cutting of the material through which the hole is to be cut.

The screw may be made of steel, and cadmium plated.

In the use of the screw to fasten an acrylic plastic sheet A in position on a purlin B a washer C is placed on the screw shank 6 so as to fit against the under side of the flanged head 10 and then the head of the screw is fitted into the socket of a power screw driver. The end of the drill point 11 is then engaged with the crest of the sheet A and a hole is drilled through the sheet, care being taken to avoid cracking of the sheet. After the drill point 11 has penetrated the sheet A the primary wings 12 engage with and form a clearance hole D through the sheet. The screw-threaded shank 8 can then move freely through the sheet A, and the front end of the drill point 11 is engaged with the purlin B.

When the drill point 11 has formed a hole E in the purlin and the shank portion 7 engages in that hole the primary wings 12 come into contact with the purlin and break away, see FIG. 3, as they are not strong enough to withstand the forces then applied to them. This leaves the hole E the correct size for engagement by the fluted portion of the shank 8 and the thread cutting means provided thereat.

As the screw is pressed further through the aligned holes D and E the front edges 14 of the secondary wings 13 engage the outer surface of the sheet A and commence the enlargement of the hole D to the relative size as depicted in FIG. 4, the hole D when so enlarged being large enough to allow for expansion and contraction of the sheet A relative to the purlin B.

The proportions of the screw are such that the secondary wings 13 commence the enlargement of the hole D before the front tapered end of the screw-threaded part 8 of the shank engages the purlin B, and enlarge the hole for at least the major part of the thickness of the plastic sheeting A before there is any substantial formation of a thread in the wall of the hole E. When the fluted part of the threaded shank 8 engages in the hole E a thread is cut in the wall of that hole and thereafter rotation of the screw causes it to be drawn through the hole D until the washer C is pressed tightly against the sheet A and said sheet is held firmly in position. At that stage the washer C forms an effective seal against weather.

The screw made according to this invention has been devised particularly for use with plastic sheeting, such as acrylic plastic sheeting, but may be used also with aluminium alloy sheeting as the primary wings 12 are sturdy enough to form a clearance hole through that material. If desired, the junction of the secondary wings to the shank portion 6 may be radiused to provide for greater strength. It is of course a matter of technical knowledge to make the primary and secondary wings 12 and 13 to suit particular requirements - to withstand the forces required in forming a clearance hole in one material and yet break off when engaged with a harder material. Thus, the primary wings 12 may be made strong enough to form the clearance hole through plastic sheeting and break off when brought into engagement with hardwood, or to form a clearance hole in a material harder than plastic sheeting and to break off when they engage with a yet harder material, such as steel.

The screw may be provided with any suitable form of head or tool-engaging means.

Further, the proportions of the screw may be varied to suit particular requirements. Thus, when made for use with, say, aluminium alloy roofing sheets it may be desirable for the screw threaded portion 8 of the shank to engage the purlin or other support member before the secondary wings 13 have commenced the enlargement of the hole in that sheeting.

Also, the invention may be applied to a self-tapping screw or other screw, instead of a thread-cutting screw as described.

It is to be understood that all such modifications as come within the scope of the appended claims are to be deemed to be included in the ambit of the invention.

We claim:

1. A drilling and reaming screw adapted to fasten a ribbed sheeting to a support surface, including a drilling tip, a threaded shank portion and a tool engaging head means, first reaming wings extending radially outwardly from the screw shank a predetermined radial extent and located between the threaded shank portion and the drilling tip, second reaming wings extending radially outwardly from the screw shank a predetermined radial extent greater than the radial extent of the first wings, said second reaming wings located between the head means and the threaded shank portion, an unthreaded shank portion extending between the second reaming wings and the head means, the radial extent of the first reaming wings being slightly greater than the crest diameter of the threaded shank portion and frangibly associated with the screw shank, whereby the screw will form a first hole in the ribbed sheeting of a size capable of providing vertical support for the shank while the drilling tip penetrates the support surface and whereby the second wings will thereafter enlarge the hole in the sheeting to permit relative movement between the sheeting and support due to thermal expansion and contraction.

2. A drilling and reaming screw in accordance with claim 1, wherein each first and second reaming wings comprise a pair of diametrically opposed members pinch formed on the shank.

3. A drilling and reaming screw in accordance with claim 1, wherein the portions of the second wings adjacent the threaded shank portion include relieved cutting edges.

4. A drilling and reaming screw in accordance with claim 1, wherein the distance between the extremity of the threaded shank portion adjacent the first wings and the portion of the second wings nearest the threaded shank portion is less than the distance between the sheeting and support so that the second wings will ream a larger hole in the sheeting without being subject to influences such as the engagement of screw threads in the support.

5. A structure including a support member, ribbed sheet member mounted on the support member by means of a screw having a drilling tip, a threaded shank portion and a tool engaging head means, first reaming wings extending radially outwardly from the screw shank a predetermined radial extent and located between the threaded shank portion and the drilling tip, second reaming wings extending radially outwardly from the screw shank a predetermined radial extent greater than the radial extent of the first wings, said second reaming wings located between the head means and the threaded shank portion, an unthreaded shank portion extending between the second reaming wings and the head means, the radial extent of the first reaming wings being slightly greater than the crest diameter of the threaded shank portion and frangibly associated with the screw shank, the distance between the extremity of the threaded shank portion which is adjacent the first reaming wings and the portions of the second wings nearest the threaded shank portion being less than the distance between the ribbed sheet member and the support member, whereby the screw will form a first hole in the ribbed sheeting of a size capable of providing vertical support for the shank while the drilling tip penetrates the support surface and whereby the second wings will thereafter enlarge the hole in the sheeting to permit relative movement between the sheeting and support due to thermal expansion and contraction, the second wings capable of reaming the larger hole without influence of thread engagement between the threaded portion and the support.

* * * * *